(12) United States Patent
Loh

(10) Patent No.: US 7,756,480 B2
(45) Date of Patent: *Jul. 13, 2010

(54) SYSTEM AND METHOD FOR TRANSMITTER LEAK-OVER CANCELLATION

(75) Inventor: Lup Meng Loh, Plano, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 685 days.

This patent is subject to a terminal disclaimer.

(21) Appl. No.: 11/707,537

(22) Filed: Feb. 16, 2007

(65) Prior Publication Data

US 2008/0198773 A1 Aug. 21, 2008

(51) Int. Cl.
*H04B 1/00* (2006.01)

(52) U.S. Cl. .......... 455/63.1; 455/67.13; 455/114.2; 455/180.3; 455/69; 455/126; 455/226.2; 455/24; 370/290; 370/495; 370/497; 370/277; 375/222; 375/144; 375/327; 375/346; 375/323; 375/325

(58) Field of Classification Search .......... 455/63.1, 455/67.13, 114.2, 114.1, 180.3, 69, 126, 455/226.2, 24; 370/290, 495, 497; 375/222, 375/144, 327, 346

See application file for complete search history.

(56) References Cited

U.S. PATENT DOCUMENTS

| 5,444,864 | A  | * | 8/1995  | Smith .......................... 455/84 |
| 6,087,898 | A  | * | 7/2000  | Baskin ....................... 330/151 |
| 7,103,094 | B2 | * | 9/2006  | Lotter et al. ................. 375/148 |
| 7,269,144 | B2 | * | 9/2007  | Gardenfors et al. ......... 370/280 |
| 7,292,649 | B2 | * | 11/2007 | Atkinson et al. ............. 375/316 |
| 7,355,993 | B2 | * | 4/2008  | Adkins et al. ................ 370/318 |
| 7,428,262 | B2 | * | 9/2008  | Zancho et al. ............... 375/148 |
| 7,580,683 | B2 | * | 8/2009  | Gardenfors et al. ........... 455/73 |

* cited by examiner

*Primary Examiner*—Marceau Milord

(57) ABSTRACT

The present disclosure relates generally to systems and methods for transmitter leak-over cancellation. In one example, a method includes transmitting a signal via a transmit chain in a wireless device, where a portion of the signal leaks over into a receive chain of the wireless device and generates higher order products that interfere with a signal being received by the wireless device. A portion of the signal from the transmit chain is diverted into cancellation circuitry coupled to the receive chain prior to a location in the transmit chain where leak-over occurs, and an amplitude and phase of the portion is manipulated. The manipulated portion is combined with the received signal and other portion to at least partially cancel interference caused by the portion leaking over into the receive chain.

21 Claims, 8 Drawing Sheets

SYSTEM AND METHOD FOR TRANSMITTER LEAK-OVER CANCELLATION

CROSS-REFERENCE TO RELATED APPLICATIONS

This application is related to U.S. patent application Ser. No. 11/707,370, filed on Feb. 16, 2007, and entitled "SYSTEM AND METHOD FOR TRANSMITTER LEAK-OVER CANCELLATION USING CLOSED LOOP OPTIMIZATION", which is hereby incorporated by reference.

BACKGROUND

Some wireless communication devices, such as those based on frequency division duplexing (FDD), are designed to simultaneously transmit and receive signals using two or more frequency channels. Such simultaneous transmission and reception may inherently introduce a modulated interferer in the transmit channel frequency at the receiver input (e.g., leak-over of the signal being transmitted from a transmit chain of the device into a receive chain). Such FDD devices generally use a duplexer to isolate between the signals being transmitted and the receiver, and the leak-over at the duplexer may depend on its isolation performance in the transmit band. Traditionally, a high degree of isolation is provided at the duplexer to minimize the leak-over of the modulated transmit signal.

FDD receivers with a direct conversion architecture are generally designed with an external inter-stage filter solely to reduce the impact of the transmit leaked-over interferer signal on a first mixer within the receive chain even though there is no image frequency. This may impose a fairly severe limitation on radio receivers supporting multi-band operations, as not only is a duplexer required at each band to provide the needed transmit band isolation (e.g., of 55 dB), but an inter-stage external filter is also needed for each band. Accordingly, the support of multiple bands imposes a large number of radio frequency (RF) input/output (I/O) demands on a radio frequency integrated circuit (RFIC) integrated with a low noise amplifier (LNA) in the receive chain. In some cases, multi-band RFICs are designed with a separate chip for the LNA, which results in a multi-chip solution.

Besides the higher component count and restrictive RF I/O requirements, the transmit leak-over may force a different receive chain architecture for TDD and FDD operational modes. The use of different architectures is forced partly because of the need for an inter-stage filter in FDD designs, which may result in the use of separate receivers in devices to support both TDD and FDD operational modes. The use of separate receivers not only increases design complexity, but also uses more die area on the RFIC. Existing proposals and implementations suggest a brute force approach for FDD designs in order to remove the inter-stage filter. However, such an approach may result in higher power consumption because of a higher mixer linearity and a higher level of complexity in calibration needed in smaller line width processes (e.g., 90 nm or less) due to larger variations in order to ensure performance in the presence of the transmit leak-over signal.

Accordingly, an improved system and method for transmitter leak-over cancellation are needed.

SUMMARY

In one embodiment, a method comprises transmitting a first signal via a transmit chain in a wireless device, wherein a first portion of the first signal leaks over into a receive chain of the wireless device and generates higher order products that interfere with a second signal being received by the wireless device. A second portion of the first signal is diverted from the transmit chain into cancellation circuitry coupled to the receive chain, wherein the second portion is diverted prior to a location in the transmit chain where leak-over occurs. An amplitude and phase of the second portion are manipulated and the manipulated second portion is combined with the second signal to at least partially cancel interference caused by the first portion leaking over into the receive chain.

In another embodiment, a method comprises transmitting a first signal via a transmit chain in a wireless device, wherein a first portion of the first signal leaks over into a receive chain of the wireless device and generates higher order products that interfere with a second signal being received by the wireless device. A second portion of the first signal diverted from the transmit chain is directed into cancellation circuitry coupled to the receive chain. An amplitude and phase of the second portion are manipulated before combining the manipulated second portion with the second signal and first portion to at least partially cancel interference caused by the first portion.

In yet another embodiment, a circuit comprises a duplexer coupling a portion of a transmit chain and a receive chain in a wireless device that uses separate frequency channels for simultaneous transmission and reception, wherein the duplexer is configured to isolate a transmitted signal in the transmit chain from a received signal in the receive chain. A directional coupler is coupled to the transmit chain and configured to divert a portion of the transmitted signal from the transmit chain to amplitude and phase matching circuitry. Amplitude and phase matching circuitry is coupled to the receive chain and the directional coupler, wherein the amplitude and phase matching circuitry includes circuitry configured to manipulate the diverted portion to create destructive interference for a portion of the transmitted signal that leaks over into the receive chain.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
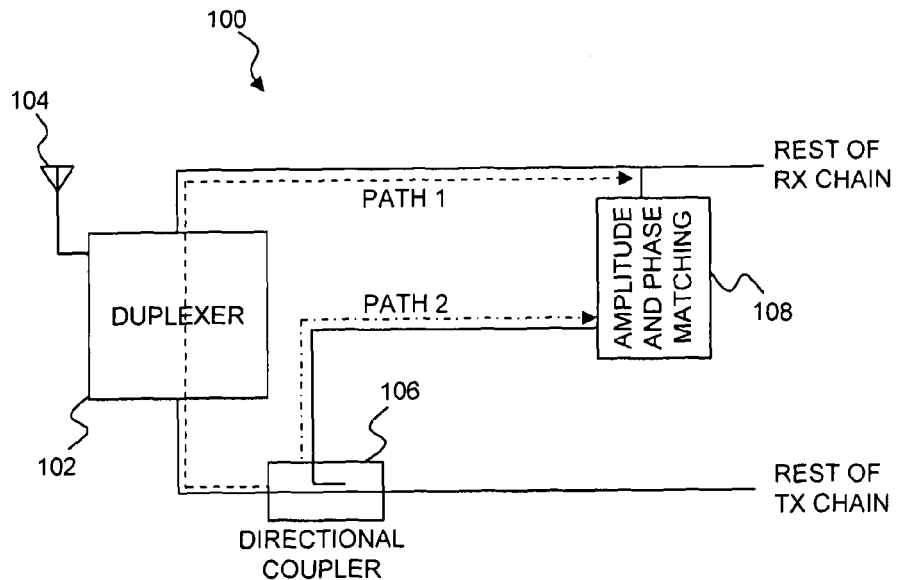
FIG. 1 is a block diagram of one embodiment of a portion of a wireless communications device having leak-over cancellation functionality.

It is to be understood that the following disclosure provides many different embodiments, or examples, for implementing different features of the disclosure. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a circuit 100 includes circuitry for minimizing or eliminating leak-over from a transmission portion of the circuit (i.e., a transmit (TX) chain) to a reception portion of the circuit (i.e., a receive (RX) chain). Both transmitted and received signals pass through a duplexer 102 coupled to an antenna 104. The duplexer 102 may contain one or more filters (not shown) for isolating the transmit chain from the receive chains. In operation, a small part of the signal being transmitted may overcome the isolation filtering of the duplexer 102 and leak from the transmit chain into the receive chain, as indicated by Path 1. This leak-over may generate higher order products that interfere with a signal being received by the circuit's receive chain.

In the present embodiment, the circuit 100 may include components for reducing the transmitter leak-over signal by means of destructive interference from the same source. To accomplish this, the circuit 100 may use a feedback loop from the transmit chain to the receive chain that manipulates the amplitude and/or phase of the signal being fed back into the receive chain.

To form the feedback loop, a directional coupler 106 may be positioned in the transmit chain. As will be described below, the directional coupler 106 may be positioned so that the signal being redirected by the directional coupler is the same signal (i.e., has the same amplitude and phase) as that entering the duplexer 106. By using the same signal source that causes the leak-over as the basis for cancellation, both the leak-over signal and the signal used for cancellation have the same reference for phase and amplitude.

The directional coupler 106 may feed a portion of the transmit signal into amplitude and phase matching circuitry 108 positioned in the receive chain as indicated by Path 2. Cancellation occurs at the LNA input and the received signal may then be passed onto the receive chain with the leak-over portion having been minimized or eliminated.

Figure 2:
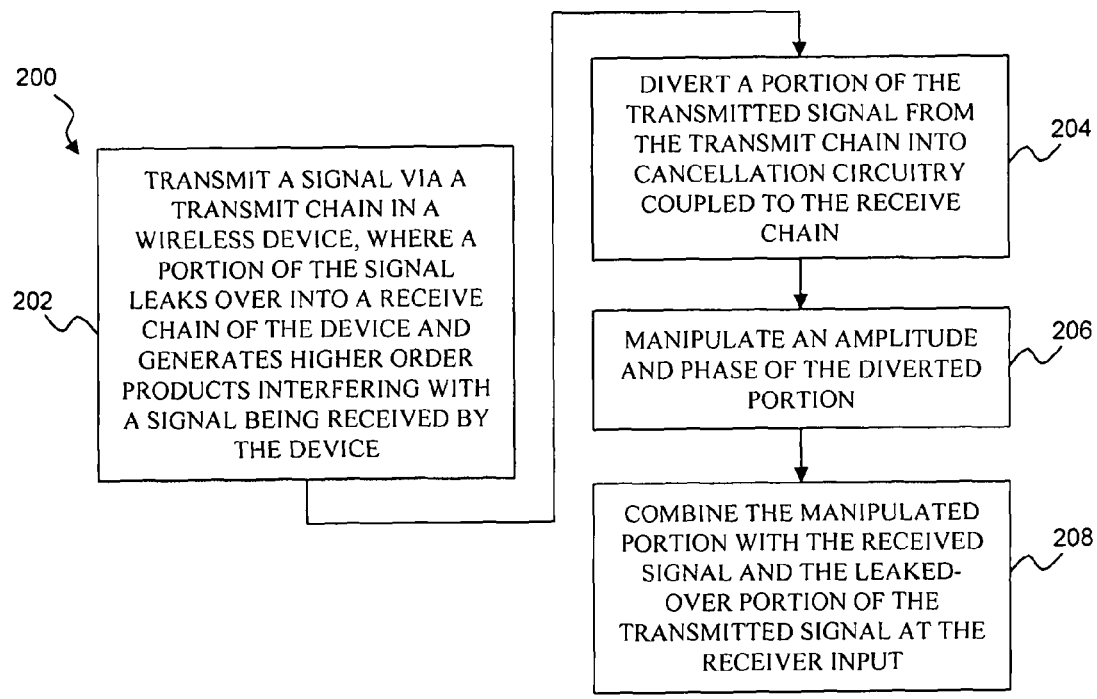
FIG. 2 is a flowchart illustrating one embodiment of a method for minimizing leak-over that may be performed in the device of FIG. 1.

Referring to FIG. 2, one embodiment of a method 200 for cancelling at least a portion of a signal leaking over from a transmit chain to a receive chain in a wireless device is illustrated. The method 200 may be used with a circuit configured as described with respect to the circuit 100 of FIG. 1, or with circuits having other configurations.

In step 202, a signal may be transmitted via the transmit chain in the wireless device. A portion of the transmitted signal may leak-over into the receive chain of the wireless device and generate higher order products that interfere with a signal received by the wireless device, as described with respect to FIG. 1. In step 204, part of the transmitted signal may be diverted from the transmit chain into cancellation circuitry coupled to the receive chain, such as amplitude and phase matching circuitry 108 of FIG. 1. The diversion may occur using a mechanism such as the directional coupler 106 of FIG. 1. The diversion may occur prior to a location in the transmit chain where the leak-over occurs (e.g., before the transmitted signal enters the duplexer 102 of FIG. 1). In step 206, an amplitude and phase of the diverted signal may be manipulated so that the diverted signal can cancel with at least a portion of the leak-over interference. In step 208, this manipulated signal is combined with the received signal to at least partially cancel interference caused by the leak-over of the transmitted signal into the receive chain.

Figure 3:
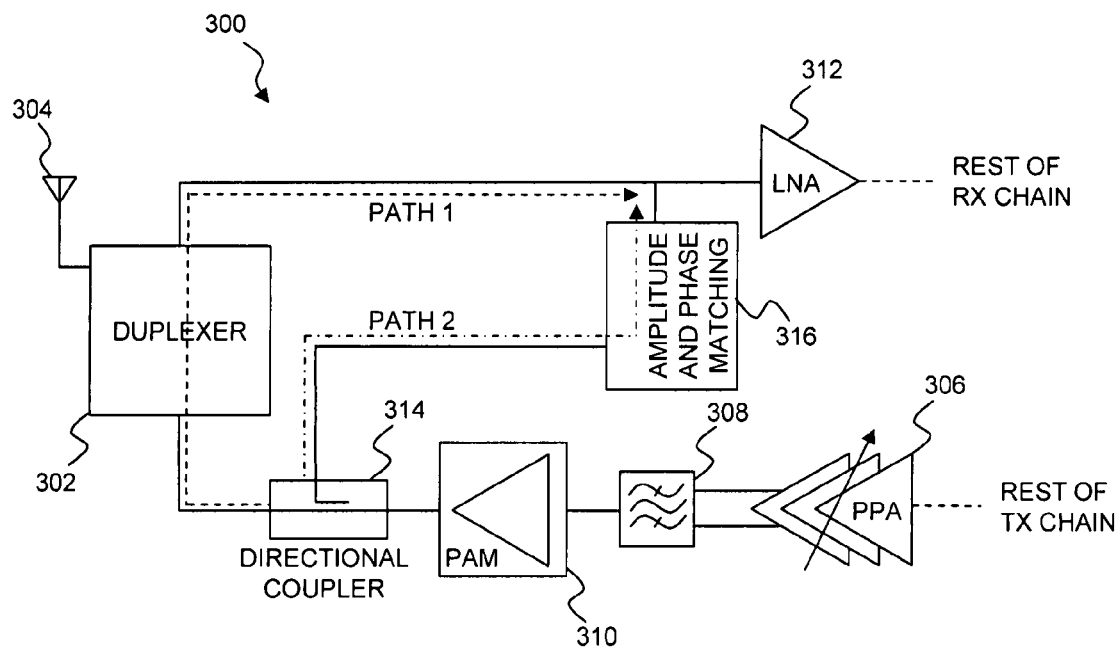
FIG. 3 is a block diagram of another embodiment of a portion of a wireless communications device having leak-over cancellation functionality.

Referring to FIG. 3, in another embodiment, a circuit 300 includes circuitry for minimizing or eliminating leak-over from a transmission portion of the circuit (i.e., a transmit chain) to a reception portion of the circuit (i.e., a receive chain). For example, the circuit 300 may be a more detailed embodiment of the circuit 100 of FIG. 1. Both transmitted and received signals pass through a duplexer 302 coupled to an antenna 304. In the present example, the transmit chain may include a pre-power amplifier (PPA) 306, an RF bandpass filter 308, and a power amplifier module (PAM) 310. Additional components (not shown) of the transmit chain may be coupled to the PPA 306. The receive chain may include a low noise amplifier (LNA) 312 coupled to other components (not shown) of the receive chain. In operation, a signal being transmitted via the transmit chain may overcome the isolation filtering of the duplexer 302 and leak from the transmit chain into the receive chain at the input of the LNA 312, as indicated by Path 1.

In the present embodiment, at least a portion of the circuit 300 may formed as an FDD transceiver application specific integrated circuit (ASIC) and may include components for reducing transmitter leak-over signal at the input of the receiver LNA 312 by means of destructive interference from the same source. As will be described below in greater detail, the circuit 300 may use a feedback loop from the transmitter PAM 310 output to the receiver LNA 312 input that provides the amplitude and phase manipulation to minimize or eliminate the interference. The feedback loop may be designed as part of or separate from the transceiver ASIC. In the present example, the feedback loop may be achieved with relatively simple design blocks with little or no impact to the transceiver's performance.

To form the feedback loop, a directional coupler 314 may be positioned in the transmit chain between the PAM 310 and the duplexer 302. Although the directional coupler 314 may be positioned elsewhere, some handset transmitters are designed with a coupler at the output of the PAM 310 for functions such as level detection and gain control, making this an ideal location without requiring additional design changes. Furthermore, this may be an ideal tap off point since the next block downstream is the duplexer 302, which is designed to isolate the transmit signal from the receive chain. By using the illustrated position of the directional coupler 314, the output of the PAM 310 (which is the source of the leak-over signal) may be used as the basis for phase cancellation at the input of the LNA 312 in the receive chain. As the same source (i.e., the PAM 310) causes the leak-over and forms the basis for the cancellation, both the leak-over signal and the signal used for cancellation have the same reference for phase and amplitude.

The directional coupler 302 may feed a portion of the transmit signal into amplitude and phase matching circuitry 316, which is positioned in the receive chain between the duplexer 302 and the LNA 312, as indicated by Path 2. Cancellation of the leak-over signal may occur at the LNA input, and a received signal may then be passed onto the LNA 312 with the leak-over portion having been minimized or eliminated.

Figure 4:
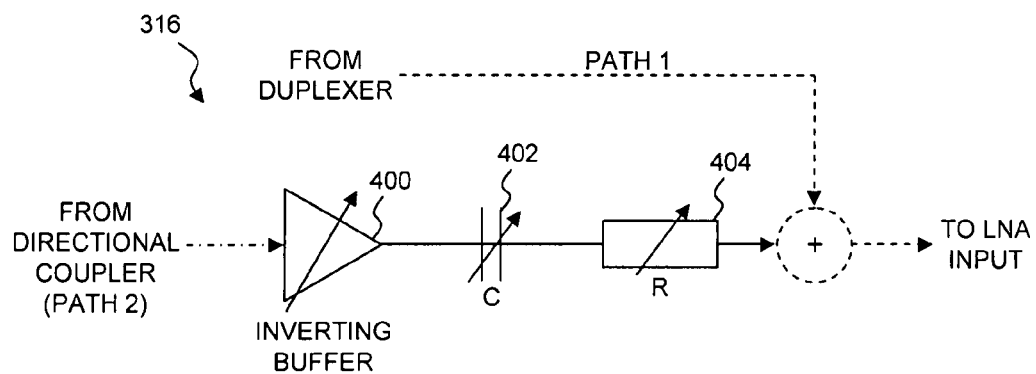
FIG. 4 is a block diagram of one embodiment of a leak-over cancellation circuit that may be used in the wireless communications device of FIG. 3.

With additional reference to FIG. 4, one embodiment of the amplitude and phase matching circuitry 316 of FIG. 3 is illustrated. In the present example, the amplitude and phase matching circuitry 316 includes an inverting buffer 400, one or more fixed or variable capacitors 402, and one or more fixed or variable resistors 404. It is understood that in some embodiments the capacitors and/or resistors may be organized in capacitive and resistive networks, respectively, in order to provide flexibility in the configuration of the circuitry 316. In operation, the redirected signal (indicated by Path 2) enters the inverting buffer 400, capacitor 402, and resistor 404 of the amplitude and phase matching circuitry 316, and exits as a signal having equal amplitude but the opposite phase as that of the leak-over signal (Path 1). The inverted signal may then be mixed with the Path 1 signal and the resulting destructive interference caused by the inverted signal may minimize or eliminate the leaked over signal.

In some embodiments of the circuit 300, it may be feasible to design the amplitude and phase matching circuitry 316 for cancellation because variation of the parameters for Path 1 and Path 2 may be relatively small during operation, which may enable an initial calibration to be performed. Otherwise, the design variations of the amplitude and phase matching circuitry 316 (e.g., resistor and capacitor values) may be more tolerable for systems like wideband code division multiple access (WCDMA), where the amount of transmit leak-over reduction to be removed may be less than approximately 5 dB to exclude the use of an inter-stage SAW filter.

In embodiments where the directional coupler 314 is external to the transceiver ASIC, the amplitude and phase properties are generally specified and may be relied upon for design of the feedback loop. If external components like the duplexer 302 exhibit relatively wide variations from part to part (i.e., different duplexers exhibit different characteristics), a one time calibration of the amplitude and phase matching circuitry 316 may be performed, such as during a transmit power calibration at the device (e.g., phone) level. In some embodiments, one or more of the inverting buffer 400, capacitors 402, and/or resistors 404 may be controllable by a processor coupled to the amplitude and phase matching circuitry 316, and the feedback loop may be dynamically controlled. In other embodiments, the feedback loop may be dynamically controlled using an analog or digital closed-loop control mechanism, as described with respect to FIG. 6.

It is understood that receive band noise from the transmitter may also be fed into the input of the LNA 312 using the described feedback loop, but the duplexer 302 generally offers much lower isolation at the receive band than the transmit band. Accordingly, with the same attenuation in Path 2, the receive band noise may be significantly lower than what is leaked over into Path 1. However, some embodiments may include a filter in the feedback path to provide more receive band rejection.

The phase manipulation of the amplitude and phase matching circuitry 316 may be accomplished using resistor and capacitor values that are chosen based upon the phase adjustments required from −180 degrees as specified by the following equations:

$$H(j\omega) = R - j1/\omega C \qquad \text{(Equation 1)}$$

or in rectangular form as $$|H(j\omega)| = SQRT(R^2 + 1/(\omega C)^2) \qquad \text{(Equation 2)}$$

$$\text{Phase} = -\arctan(1/(\omega RC)) \qquad \text{(Equation 3)}$$

where j is $SQRT(-1)$, $\omega$ is the normalized frequency, $H(j\omega)$ is the frequency response of the system $H(\ )$, R is the resistive value, and C is the capacitive value. Accordingly, by adjusting C with a pre-determined R value, the phase of the feedback loop can be manipulated. The inverting buffer 400 may provide the −180 degree inversion. Using a relatively high value resistor 404 at the input of the LNA 312 tap-in point may serve to minimize the impedance matching impact on the LNA. The amplitude and phase matching circuitry 316 may vary the amplitude of the feedback loop by adjusting the gain of the inverting buffer 400.

Figure 5:
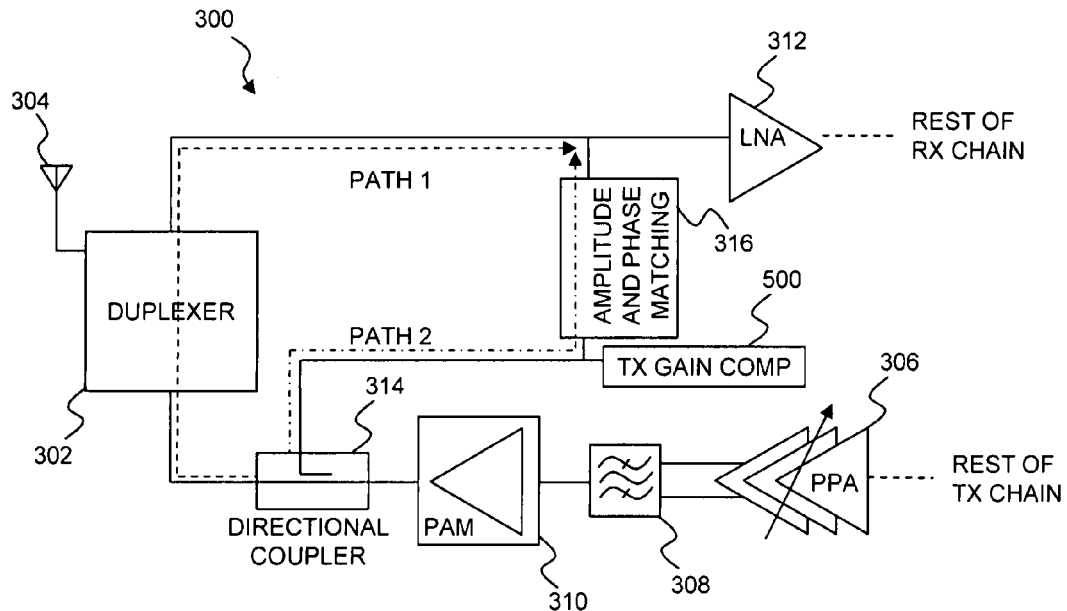
FIG. 5 is a block diagram of another embodiment of a portion of a wireless communications device having leak-over cancellation functionality.

Referring to FIG. 5, in another embodiment, the circuit 300 of FIG. 3 is illustrated with a transmit gain comparator 500. It is understood that the signal provided by Path 2 may be used for many different purposes and that the signal comparison provided by the gain comparator 500 is only one example.

Figure 6:
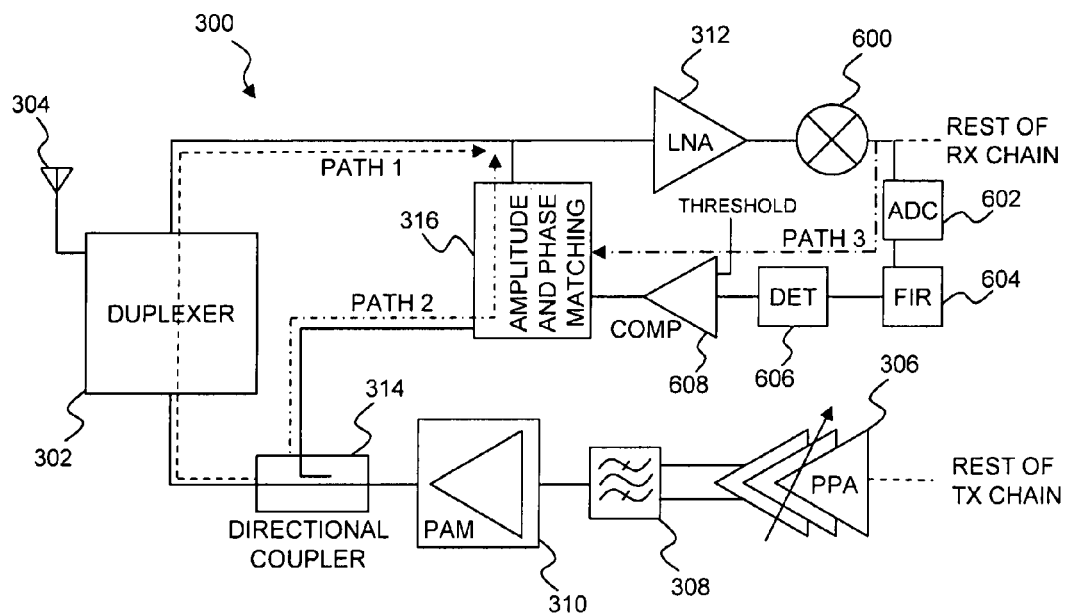
FIG. 6 is a block diagram of yet another embodiment of a portion of a wireless communications device having leak-over cancellation functionality.

Referring to FIG. 6, in yet another embodiment, the circuit 300 of FIG. 3 is illustrated with closed loop control functionality to optimize the leak-over cancellation process described with respect to FIG. 3. The closed loop signal may follow a signal path indicated by Path 3. In the present example, the signal for the closed loop functionality may be provided by tapping the received signal after the signal passes through a mixer 600 coupled to the output of the LNA 312 in the receive chain to bring the signal down to baseband for low frequency processing. The closed loop control functionality may be provided by an analog to digital converter (ADC) 602, a filter (e.g., a finite impulse response filter) 604, a power level detector 606, and a comparator 608. The ADC 602 may receive the tapped signal and the comparator 608 may provide the control signals to the amplitude and phase matching circuitry 316.

Although not shown, a digital to analog converter (DAC) may be positioned in the closed loop (e.g., between the comparator 608 and amplitude and phase matching circuitry 316) to convert the digital signal into an analog signal. For example, if the amplitude and phase matching circuitry 316 is analog, the DAC may be used. Although the present embodiment illustrates a digital closed loop control mechanism, it is understood that the closed loop control functionality may be provided using analog components or using a mixture of digital and analog components.

To optimize the cancellation functionality provided by the amplitude and phase matching circuitry 316, the level of the transmit leak-over may be detected and the closed loop control mechanism may be used to adjust the phase and amplitude of the feedback loop. The detection may be performed in the digital domain where a carrier signal can be effectively filtered out to isolate the transmit leak-over portion of the signal. The phase and amplitude of the feedback loop may then be adjusted (e.g., by storing one or more values in a register to alter the configurations of the inverting buffer 400, capacitor 402, and/or resistor 404 of FIG. 4) to get the detectable transmit leak-over level below a preset threshold. Since it is the relative level of the detected transmit leak-over being compared to the threshold, only a small amount of the signal need be tapped from the main receive chain for detection. It is understood that the threshold may be preset to a level of transmit leak-over that is suitable for the receive chain.

Accordingly, the received signal, after cancellation of all or a portion of the leak-over has occurred, passes through the mixer 600. A portion of the received signal enters the rest of the receive chain, while another portion enters the ADC 602 and is converted into a digital signal. After conversion, the signal passes through the filter 604, which isolates the leak-over portion of the signal and passes the isolated leak-over portion to the power level detector 606. The power level detector 606 measures the signal strength of the leak-over portion. The output of the power level detector 606 enters the comparator 608, which compares the power level detector's output to a threshold. The output of the comparator 608 is fed back into the amplitude and phase matching circuitry 316 and may be used to modify how the diverted signal received from the directional coupler 314 is manipulated. For example, the closed loop control circuit may vary the amplitude by adjusting the gain of the inverting buffer 400 (FIG. 4) and may tune the phase by changing the overall capacitance (e.g., by switching embedded capacitors of a capacitor network).

Figure 7:
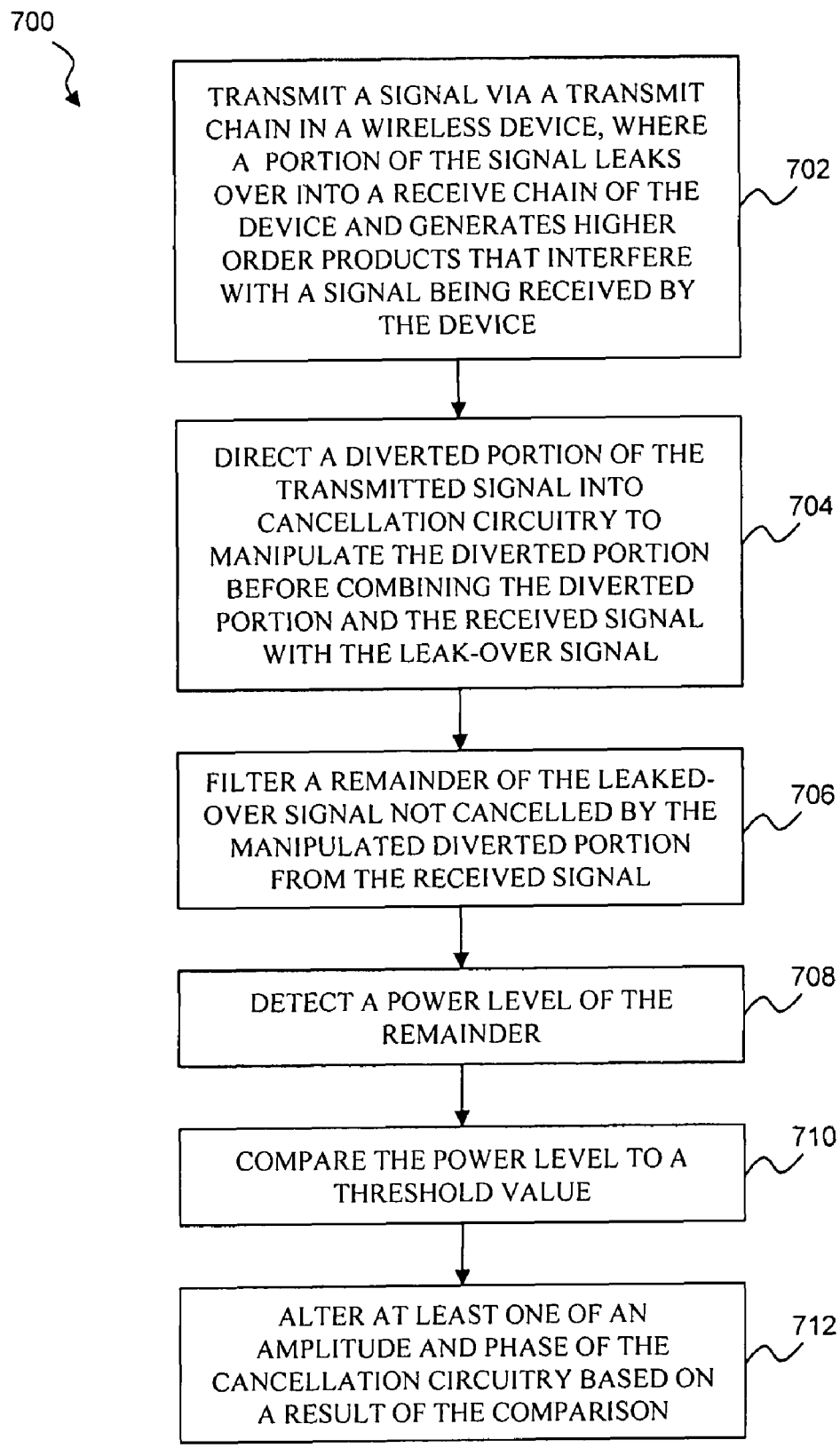
FIG. 7 is a flowchart illustrating one embodiment of a method for minimizing leak-over in the device of FIG. 6.

Referring to FIG. 7, one embodiment of a method 700 for optimizing a leak-over cancellation circuit is illustrated. The method may be used with a circuit configured as described with respect to the circuit 600 of FIG. 6, or with circuits having other configurations.

In step 702, a signal may be transmitted via a transmit chain in a wireless device, where a portion of the signal leaks over into a receive chain of the device and interferes with a signal being received by the device. In step 704, the received signal, the leak-over portion, and a diverted portion of the transmitted signal may be directed into cancellation circuitry (e.g., the amplitude and phase matching circuitry 316 of FIG. 4) to manipulate the diverted portion before combining the diverted portion and the received signal. In step 706, a remainder of the leaked signal not cancelled by the manipulated portion may be filtered from the received signal. In steps 708 and 710, respectively, a power level of the remainder may be detected and compared to a threshold value. In step 712, at least one of an amplitude and phase of the cancellation circuitry may be altered based on a result of the comparison.

Figure 8A:
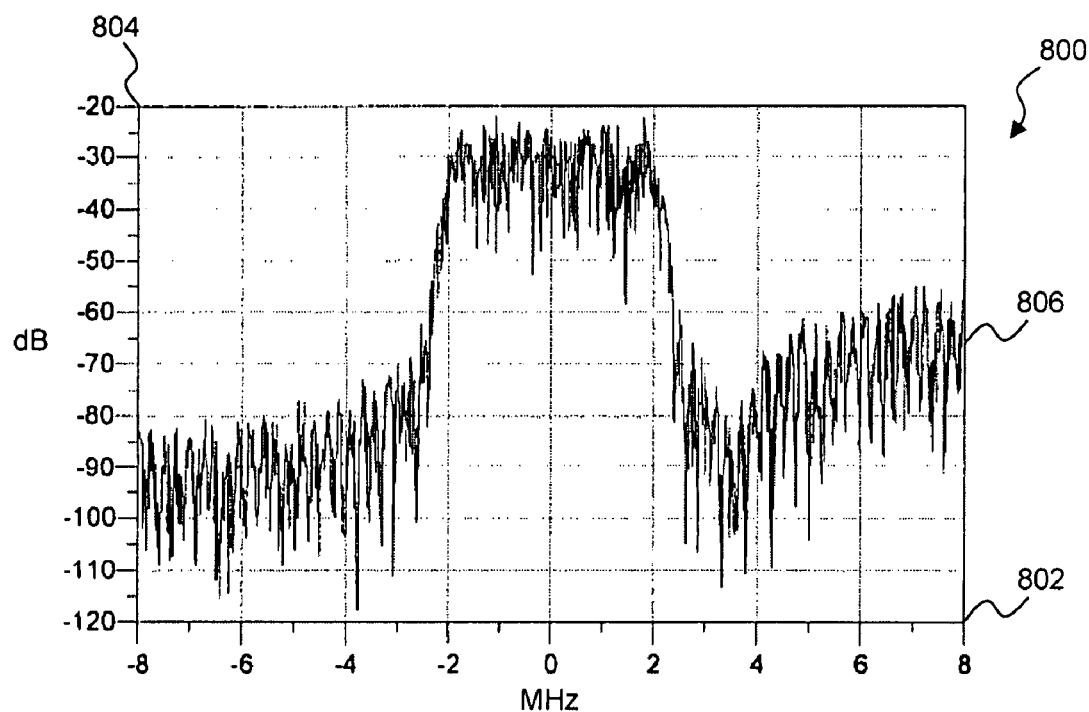
FIGS. 8A and 8B are graphs illustrating one embodiment of a receive chain low noise amplifier's (LNA) output leak-over spectrum and the LNA's output cross-modulation spectrum, respectively, without cancellation of the transmit leak-over.
Figure 8B:
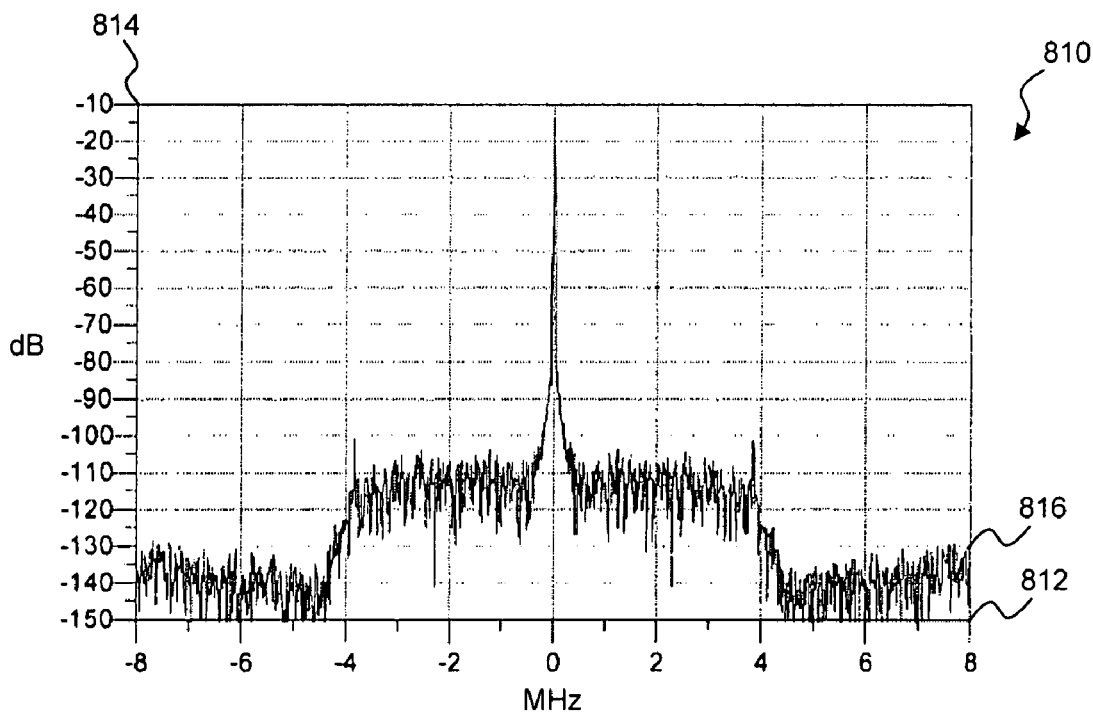

Referring to FIGS. 8A and 8B, graphs 800 and 810 illustrate simulation results of one embodiment of a receive chain LNA's (e.g., the LNA 312 of FIG. 3) output leak-over spectrum and the LNA's output cross-modulation spectrum, respectively, without cancellation of the transmit leak-over. In the present example, the simulation model used a WCDMA FDD Uplink generator to emulate the transmitter output from the PPA 310 and used a SAW filter block to emulate duplexer transmit band rejection. FIG. 8A, which includes an x-axis 802 representing the frequency in MHz and a y-axis 804 representing dB, illustrates the transmit signal spectrum 806 at the LNA output without cancellation. FIG. 8B, which includes an x-axis 812 representing the frequency in MHz and a y-axis 814 representing dB, illustrates the cross-modulation product 816 between a CW tone and the transmit leak-over modulated interferer at the LNA output without cancellation.

Figure 9A:
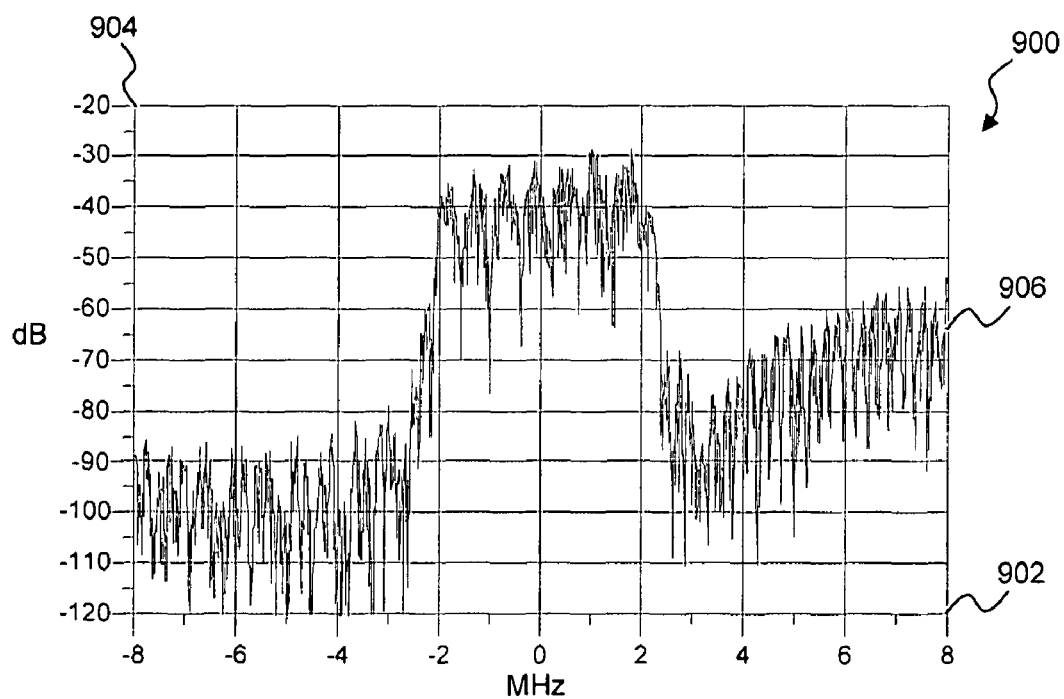
FIGS. 9A and 9B are graphs illustrating one embodiment of a receive chain low noise amplifier's (LNA) output leak-over spectrum and the LNA's output cross-modulation spectrum, respectively, with cancellation of the transmit leak-over using a first cancellation circuitry configuration.
Figure 9B:
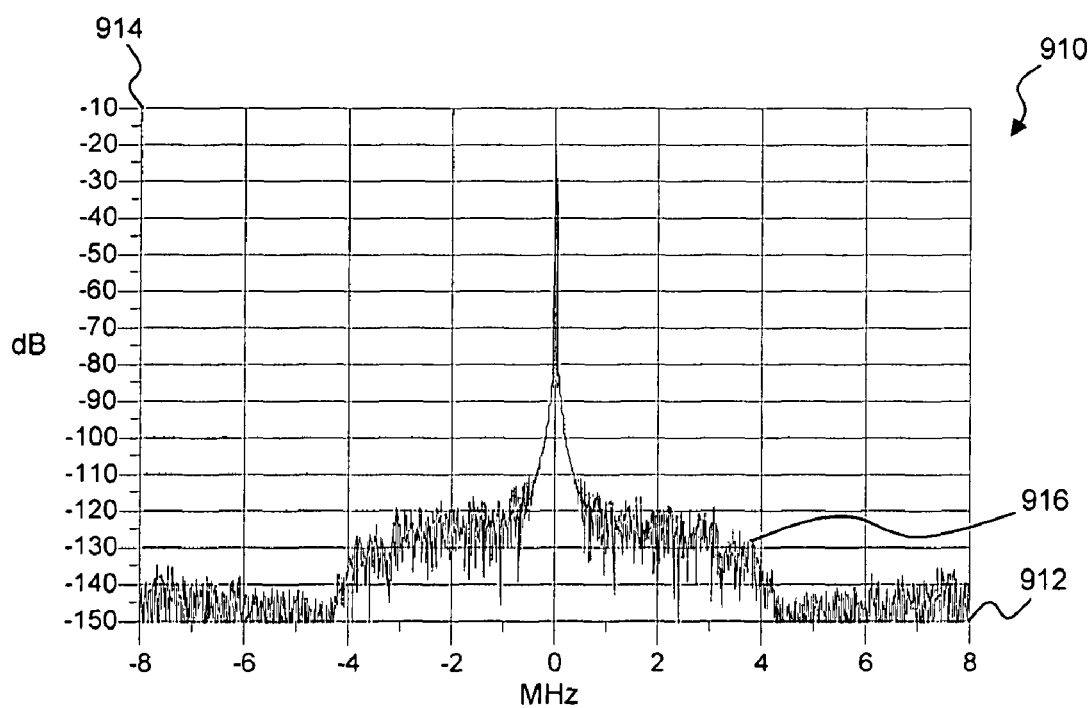

Referring to FIGS. 9A and 9B, graphs 900 and 910 illustrate simulation results of one embodiment of the receive chain LNA's (e.g., the LNA of FIGS. 8A and 8B) output leak-over spectrum and the LNA's output cross-modulation spectrum between a CW tone and the transmit leak-over modulated interferer, respectively, with cancellation of the transmit leak-over. In the present example, the simulation model used a capacitor value of 0.125 pF, a resistor value of 1.5 kΩ, feedback power at the LNA input of −30 dBm, and a phase shift of −225.4 degrees. FIG. 9A, which includes an x-axis 902 representing the frequency in MHz and a y-axis 904 representing dB, illustrates the transmit signal spectrum 906 at the LNA output with cancellation using cancellation circuitry configured using the above values. FIG. 9B, which includes an x-axis 912 representing the frequency in MHz and a y-axis 914 representing dB, illustrates the cross-modulation product 916 between the CW tone and the transmit leak-over modulated interferer at the LNA output with the same configuration of the cancellation circuitry.

Figure 10A:
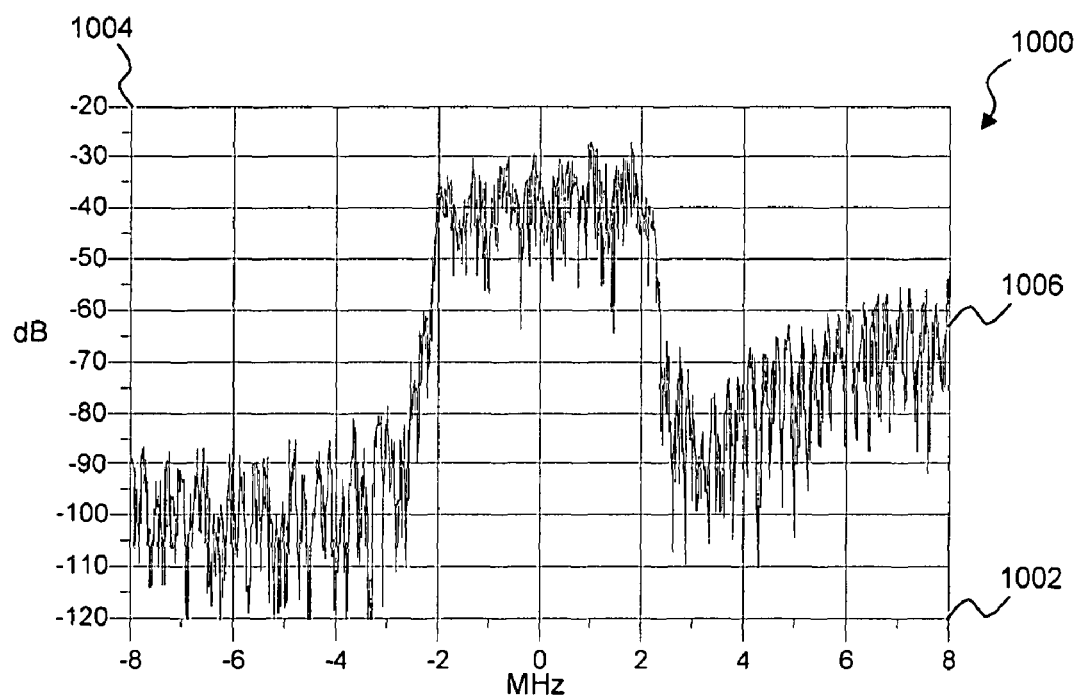
FIGS. 10A and 10B are graphs illustrating another embodiment of a receive chain low noise amplifier's (LNA) output leak-over spectrum and the LNA's output cross-modulation spectrum, respectively, with cancellation of the transmit leak-over using the cancellation circuit of FIG. 4.
Figure 10B:
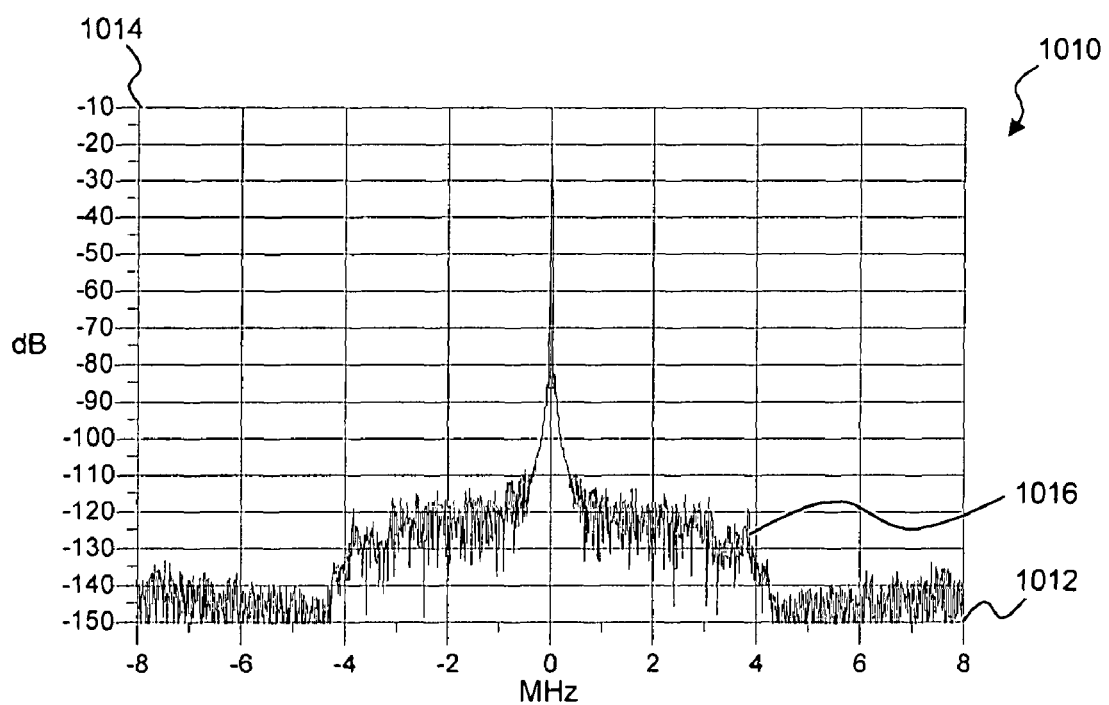

Referring to FIGS. 10A and 10B, graphs 1000 and 1010 illustrate simulation results of one embodiment of a receive chain LNA's (e.g., the LNA of FIGS. 8A and 8B) output leak-over spectrum and the LNA's output cross-modulation spectrum, respectively, with cancellation of the transmit leak-over. In the present example, the simulation model used a capacitor value of 0.2 pF, a resistor value of 1.5 kΩ, feedback power at the LNA input of −30 dBm, and a phase shift of −212.4 degrees. FIG. 10A, which includes an x-axis 1002 representing the frequency in MHz and a y-axis 1004 representing dB, illustrates the transmit signal spectrum 1006 at the LNA output with cancellation using cancellation circuitry configured using the above values. FIG. 10B, which includes an x-axis 1012 representing the frequency in MHz and a y-axis 1014 representing dB, illustrates the cross-modulation product 1016 between the CW tone and the transmit leak-over modulated interferer at the LNA output with the same configuration of the cancellation circuitry.

Figure 11A:
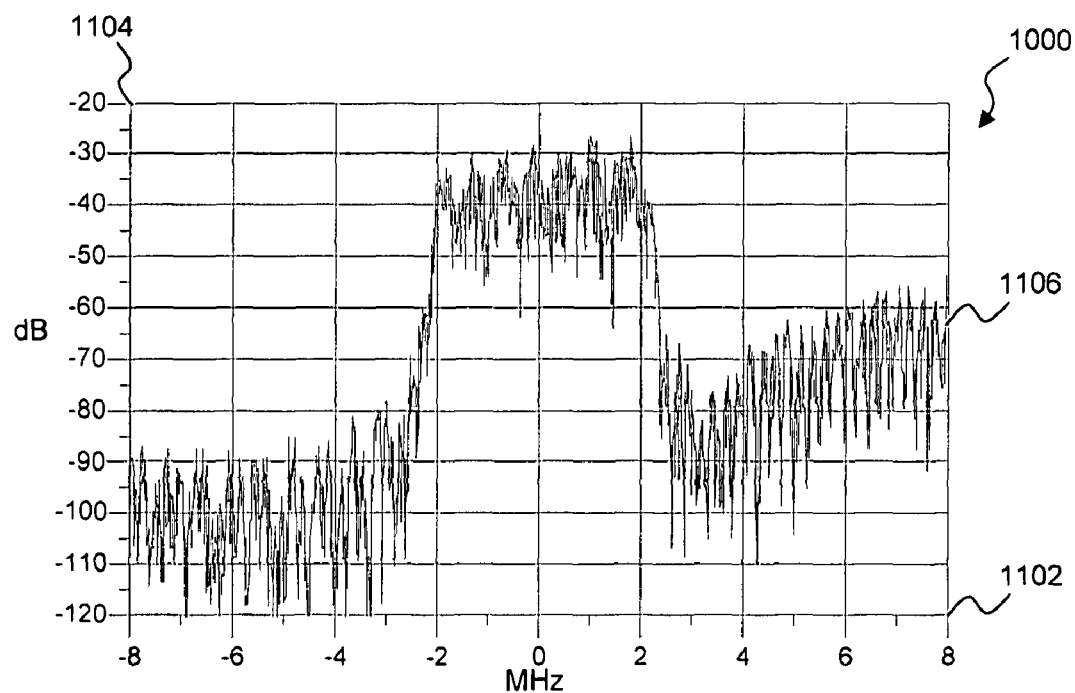
FIGS. 11A and 11B are graphs illustrating yet another embodiment of a receive chain low noise amplifier's (LNA) output leak-over spectrum and the LNA's output cross-modulation spectrum, respectively, with cancellation of the transmit leak-over using variations of the cancellation circuit of FIG. 4.
Figure 11B:
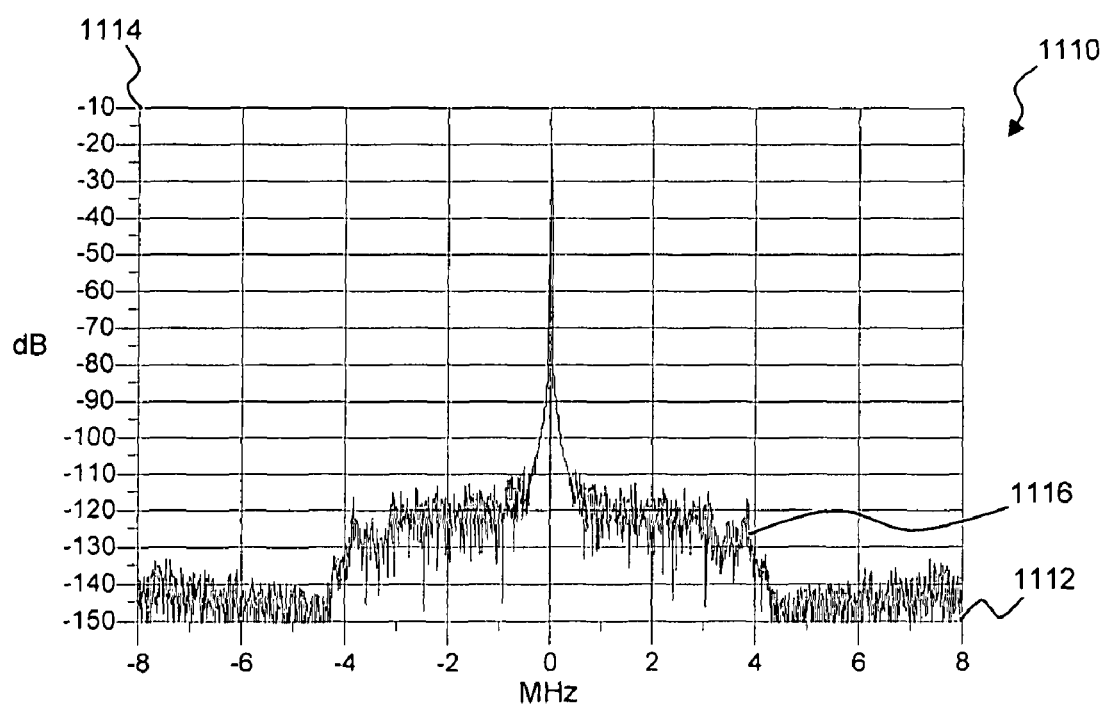

Referring to FIGS. 11A and 11B, graphs 1100 and 1110 illustrate simulation results of one embodiment of a receive chain LNA's (e.g., the LNA of FIGS. 8A and 8B) output leak-over spectrum and the LNA's output cross-modulation spectrum, respectively, with cancellation of the transmit leak-over. In the present example, the simulation model used a capacitor value of 0.25 pF, a resistor value of 1.5 kΩ, feedback power at the LNA input of −30 dBm, and a phase shift of −206.9 degrees. FIG. 11A, which includes an x-axis 1102 representing the frequency in MHz and a y-axis 1104 representing dB, illustrates the transmit signal spectrum 1106 at the LNA output with cancellation using cancellation circuitry configured using the above values. FIG. 11B, which includes an x-axis 1112 representing the frequency in MHz and a y-axis 1114 representing dB, illustrates the cross-modulation product 1116 at the LNA output with the same configuration of the cancellation circuitry.

It is noted that the effects of cancellation may vary depending on the phase setting and the phase setting may manipulated by adjusting the capacitance in the cancellation loop as explained previously. Furthermore, simulation results show that the receiver LNA performance may remain unaffected, as can be seen by the CW tone level at the output, while the transmit spectrum and the corresponding cross modulation product may be reduced using a cancellation loop as described above.

Although the present disclosure illustrates the cancellation circuitry as being implemented in hardware, it is understood that some or all of the cancellation circuitry and the functions described herein may be implemented in software, hardware, or a combination of software and hardware. Accordingly, the specific circuit configurations described herein are for purposes of example only and are not intended to limit the invention.

Although only a few exemplary embodiments of this disclosure have been described in details above, those skilled in the art will readily appreciate that many modifications are possible in the exemplary embodiments without materially departing from the novel teachings and advantages of this disclosure. Also, features illustrated and discussed above with respect to some embodiments can be combined with features illustrated and discussed above with respect to other embodiments. For example, various steps from different flow charts may be combined, performed in an order different from the order shown, or further separated into additional steps. Furthermore, steps may be performed by network elements other than those disclosed. Accordingly, all such modifications are intended to be included within the scope of this disclosure.

What is claimed is:

1. A method comprising:
    transmitting a first signal via a transmit chain in a wireless device, wherein a first portion of the first signal leaks over into a receive chain of the wireless device and generates higher order products that interfere with a second signal being received by the wireless device;
    diverting a second portion of the first signal from the transmit chain into cancellation circuitry coupled to the receive chain, wherein the second portion is diverted prior to a location in the transmit chain where leak-over occurs;
    manipulating an amplitude and phase of the second portion; and
    combining the manipulated second portion with the second signal and the first portion to at least partially cancel interference caused by the first portion leaking over into the receive chain.

2. The method of claim 1 further comprising performing a calibration of the cancellation circuitry.

3. The method of claim 2 wherein the calibration is performed during a transmit power calibration of the wireless device.

4. The method of claim 2 wherein the calibration is performed between the wireless device and another wireless device during production calibration of the wireless device.

5. The method of claim 1 wherein manipulating the phase of the second portion includes inverting the phase.

6. The method of claim 5 wherein inverting the phase includes passing the second portion through an inverting buffer.

7. The method of claim 6 wherein manipulating the amplitude includes altering at least one of a gain of the inverting buffer and a resistor value.

8. The method of claim 5 wherein manipulating the phase includes adjusting at least one of a capacitor value and a resistor value within the cancellation circuitry.

9. The method of claim 1 wherein no calibration is performed if an amount of cancellation needed is less than a predefined threshold of decibels.

10. A method comprising:
    transmitting a first signal via a transmit chain in a wireless device, wherein a first portion of the first signal leaks over into a receive chain of the wireless device and generates higher order products that interfere with a second signal being received by the wireless device;
    directing a second portion of the first signal diverted from the transmit chain into cancellation circuitry coupled to the receive chain; and
    manipulating an amplitude and phase of the second portion before combining the manipulated second portion with the second signal and first portion to at least partially cancel interference caused by the first portion.

11. The method of claim 10 wherein manipulating the phase of the second portion includes inverting the phase.

12. The method of claim 11 wherein manipulating the amplitude includes altering at least one of a gain of the inverting buffer and a resistor value.

13. The method of claim 11 wherein manipulating the phase includes adjusting at least one of a capacitor value and a resistor value within the cancellation circuitry.

14. A circuit comprising:
    a duplexer coupling a portion of a transmit chain and a receive chain in a wireless device that uses separate frequency channels for simultaneous transmission and reception, wherein the duplexer is configured to isolate a transmitted signal in the transmit chain from a received signal in the receive chain;
    a directional coupler coupled to the transmit chain and configured to divert a portion of the transmitted signal from the transmit chain to amplitude and phase matching circuitry; and
    amplitude and phase matching circuitry coupled to the receive chain and the directional coupler, wherein the amplitude and phase matching circuitry includes circuitry configured to manipulate the diverted portion to create destructive interference for a portion of the transmitted signal that leaks over into the receive chain.

15. The circuit of claim 14 wherein the directional coupler is positioned in the transmit chain between the duplexer and a power amplifier, wherein the output of the power amplifier is fed into the duplexer.

16. The circuit of claim 14 wherein the amplitude and phase matching circuitry is positioned between the directional coupler and an input of a low noise amplifier, wherein the output of the amplitude and phase matching circuitry is fed into the input of the low noise amplifier.

17. The circuit of claim 16 wherein the amplitude and phase matching circuitry includes an inverted buffer, at least one capacitor block of variable capacitance, and at least one resistor block of variable resistance configured to substantially invert a phase and vary an amplitude of the diverted portion.

18. The circuit of claim 17 wherein a value of the resistor is selected to minimize an impact to a return loss of the input of the low noise amplifier.

19. The circuit of claim 14 further comprising a filter positioned between the directional coupler and the amplitude and phase matching circuitry, wherein the filter is configured to remove interference caused by the received signal leaking over into the transmit chain.

20. The circuit of claim 14 further comprising a filter positioned between the directional coupler and the amplitude and phase matching circuitry, wherein the filter is configured to reduce transmit chain receiver band noise and spurious leaking over into the receiver chain.

21. The circuit of claim 14 wherein the wireless device is configured to use frequency division duplexing.

* * * * *